Dec. 2, 1958 H. A. JURGENS ET AL 2,862,555

CARD PUNCHING MACHINES

Filed Nov. 12, 1954 4 Sheets-Sheet 1

INVENTORS
HENRY A. JURGENS
DONALD K. REX
BY
J. W. Lorwitzer
ATTORNEY

Dec. 2, 1958 H. A. JURGENS ET AL 2,862,555

CARD PUNCHING MACHINES

Filed Nov. 12, 1954 4 Sheets-Sheet 2

INVENTORS
HENRY A. JURGENS
DONALD K. REX

BY J. W. Lowenitzer

ATTORNEY

Dec. 2, 1958 H. A. JURGENS ET AL 2,862,555

CARD PUNCHING MACHINES

Filed Nov. 12, 1954 4 Sheets-Sheet 3

INVENTORS
HENRY A. JURGENS
DONALD K. REX
BY
A. W. Rommitzer
ATTORNEY

INVENTORS
HENRY A. JURGENS
DONALD K. REX
BY J. W. Lomnitzer
ATTORNEY

United States Patent Office 2,862,555 Patented Dec. 2, 1958

2,862,555

CARD PUNCHING MACHINES

Henry A. Jurgens, Vestal, and Donald K. Rex, Endicott, N. Y., assignors to International Business Machines Corporation, New York, N. Y., a corporation of New York Application November 12, 1954, Serial No. 468,342

6 Claims. (Cl. 164—115)

This invention relates to punching machines, particularly to the type adapted to punch cards utilized to control statistical machines, such as computing machines, sorting machines, and the like. With the advent of sorting and computing machines of the card controlled type which carry out card sorting operations and computations at much higher speeds than heretofore, it is now required that punching devices for cards also be available which operate at higher speeds than now possible, in order that the machines which are controlled by these cards be constantly supplied with punched cards to enable them to operate at their maximum efficiency.

It is, therefore, the main object of the present invention to devise improvements for a card punch which enables it to punch cards at a rate of at least 165 cards per minute which is greatly in excess of that now possible in commercial card punching machines.

The higher punching speed has been attained by a coordination of three principal improvements. (1) A novel card indexing mechanism; (2) a straight line actuation of the punch bail; and (3) an electromagnetically controlled punch selecting mechanism including power means for positively connecting interposers with the punch bail and disconnecting therefrom when punching has been completed. While the attainment of the higher punching speeds may be preferably attained by the coordination of these three features and other constructions not specifically mentioned herein, each of these improvements may be separately utilized in the form of punching machine shown, or in other forms of punching machines with the same advantages.

It is, therefore, an object of the invention to devise a card indexing mechanism for a card punch mechanism comprising a plurality of progressively operated card stops against which the card is constantly urged and to provide means preferably in the form of a series of cams of such formation that they progressively operate the stops to retain the card at each index point position for perforation by the punch if it should have been selected at this time.

An object of the invention in connection with the punch selecting mechanism is to provide a power-operated interposer operating bail which is adapted when an interposer is to be connected to the punch bail to move said interposer in said connecting position and at the termination of the punch operation cause said bail to positively retract the interposer to a position disengaged from the punch bail. A construction of this type has a number of advantages in that there is a positive connection and disconnection of the interposer to and from the punch bail and is effected by power-operated means rather than by the energization of the magnet which selects the punch for operation.

A still further object, particularly in connection with the punch selecting mechanism, is to provide a series of hooks, each of which is in the form of a goose-neck and is adapted to be selectively connected to the interposer operating bail.

A still further object also in connection with the punch selecting mechanism is to provide a series of slides for said hooks, all of which are operated by a supplemental bail to such a position that a certain position of the slides causes the associated hooks to be rocked to engage the interposer bail and to provide means to cause each slide to be retracted to another position if the magnet is not energized so that its hook will not be rocked to be connected with the interposer operating bail. The design is such that when the magnet is energized the associated slide is retained in said certain position so that the hook will be moved in engagement with the bail and the latter will then move the related interposer to effect the connection and disconnection with the punch operating bail.

An advantage of such construction is that the control magnets do not appreciably work but merely temporarily retain the slides in adjusted position, their position being retained by latching means. Accordingly, the magnets may be smaller than that possible heretofore and require only a small amount of current and a short impulse for their effective operation.

Other objects of the invention will be pointed out in the following description and claims and illustrated in the accompanying drawings, which disclose, by way of example, the principle of the invention and the best mode, which has been contemplated, of applying that principle.

*Punches and punch driving mechanism*

Figure 1:
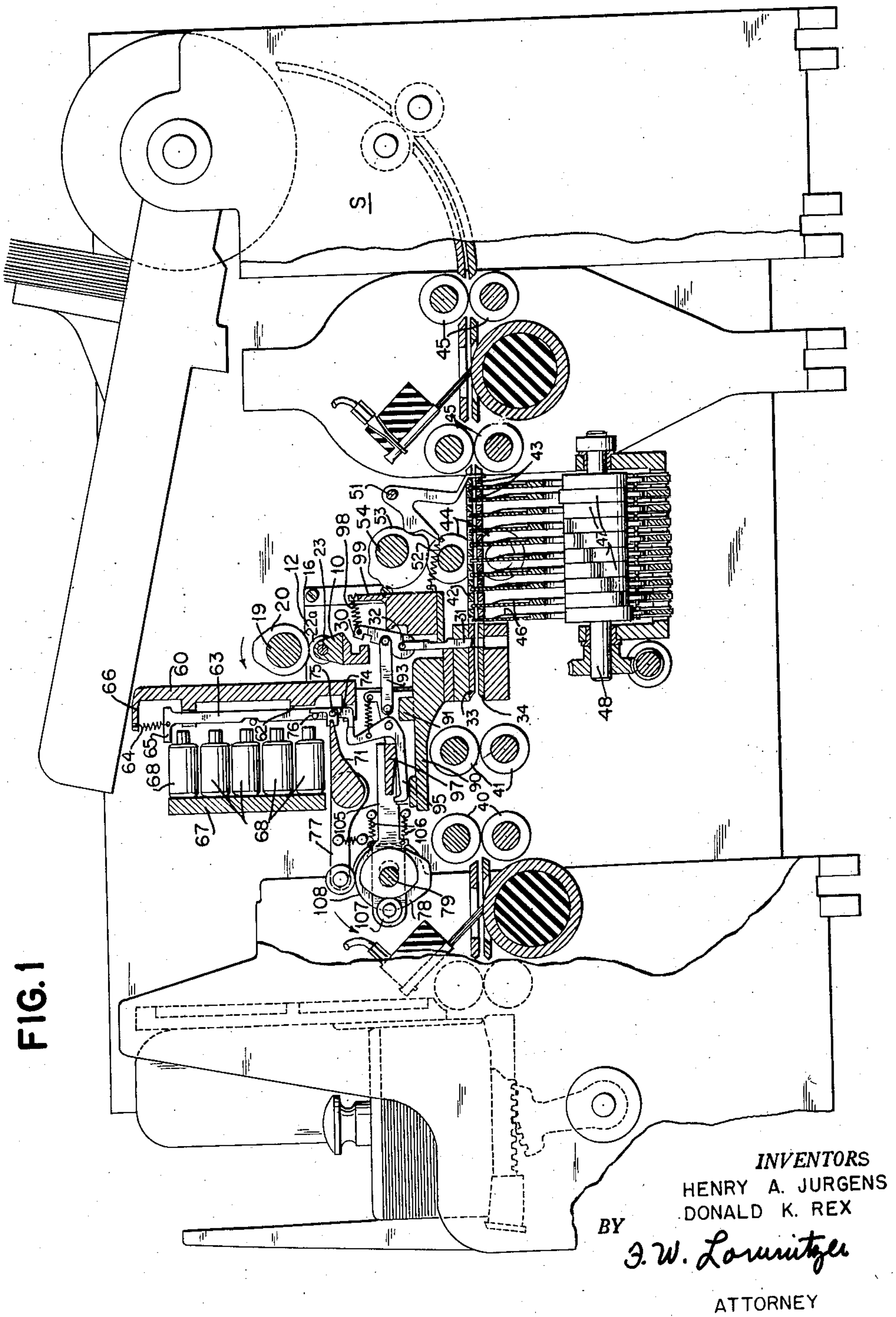
Fig. 1 is a longitudinal sectional view showing the present improvements embodied in a well known form of card punching machines.

It is preferable for the accomplishment of high speed card punching operations to keep all of the operating forces for the card punches in a straight line. To this end the punch bail 10 (Figs. 2 and 3) is carried by and is between two slide bars 11 and 12. For a convenient slidable mounting of the punch bail frame in fixed guides, each slide bar 11 or 12 is provided with stepped ends 15 which fit in and slide in complementary ends of a pair of fixed guide bars 16.

The punch bail frame is positively driven downwardly by cams and returned by complementary cams. To this end a repeatedly rotatable shaft 19 carries a plurality of cams 20 which cooperate with ball bearing follower rollers 22*a* journaled in a rod 23 (Fig. 2) carried by the punch bail 10. At the ends of shaft 19 there are provided cams 22 which cooperate with associated ball bearing follower rollers 24 at the ends of stub shafts 21 carried by the respective slide bars 11 and 12. Thus, deflections in the bail itself are avoided since the driving force on the punch bail frame is applied by cams 20 at two places between the slide bars 11 and 12 and by cams 22 at each end. The bail is driven back by means of complementary cams 25 driven by shafts 26 which also repeatedly rotate in synchronism with the shaft 19. Such complementary cams rotate in the same direction as cams 22 to keep the wear on the ball bearing followers 24 to a minimum. By utilizing the above described means for reciprocating the punch bail 10 the latter may reciprocate an increased number of times in the same period over the prior constructions. If so desired, dynamic balancing may be secured by placing counterweights on the rotating cam shaft 19, or shafts 26.

Shafts 19 and 26 are driven by a suitable driving means to repeatedly rotate in a card cycle and to rotate one revolution for each cycle point in a machine cycle.

Bail 10 is provided with a longitudinal clutch shoulder 28 (Fig. 2) adapted to receive the notch 29 of each interposer 30 which is rocked for actuation of the related punch 31, to which the interposer 30 is pivoted at 32. As is customary the punches 31, of which there is one for each horizontal row of the card to be punched, reciprocates in a stripper plate 33 (Fig. 2) and in a die bar 34, the card, of course, being fed therebetween.

The formation of the cams 20 and 22 is such that a desired period of time is provided for first rocking the interposers 30 into engagement with the shoulder 28 of the punch bail 10, prior to the descent of the latter and thereafter said cams depress the selected punches 31 in an accelerated motion, thereby avoiding sudden punch operations as in prior constructions where the interposers are rocked into engagement with the bail at the time it is being moved downwardly.

*Card indexing mechanism*

The function of this mechanism is to control the progressive movement of the card through the punching mechanism. This is accomplished by feeding the card row by row and temporarily stopping the card feed at the time the selected punches are depressed. For a well known type of card used in commercial card controlled statistical machines the indexing mechanism indexes the card in a series of ¼" steps and herein comprises a series of successively operated card gates against which the card is frictionally fed.

As the card leaves a series of rollers 40 which are pressure-rollers at the first reading station it enters a pair of frictionally driven feeding rollers 41 of a well known construction. Such feeding rollers are normally separated a distance somewhat less than the thickness of the card so that a card between such rollers will be frictionally driven by the rollers with a slight amount of power sufficiently small to enable the card to be stopped. As the leading edge of the card emerges from the rollers 41 it passes between the stripper plate 33 and the die bar 34 and thence between a pair of slotted plates 42 and 43. As the card is stepped row by row it ultimately is received by a second set of frictionally driven rollers 44 and upon emerging from the guide plates 42 and 43 the card is fed into a reading and storage section of the machine by sets of pressure rollers 45 (Fig. 1).

Figure 4:
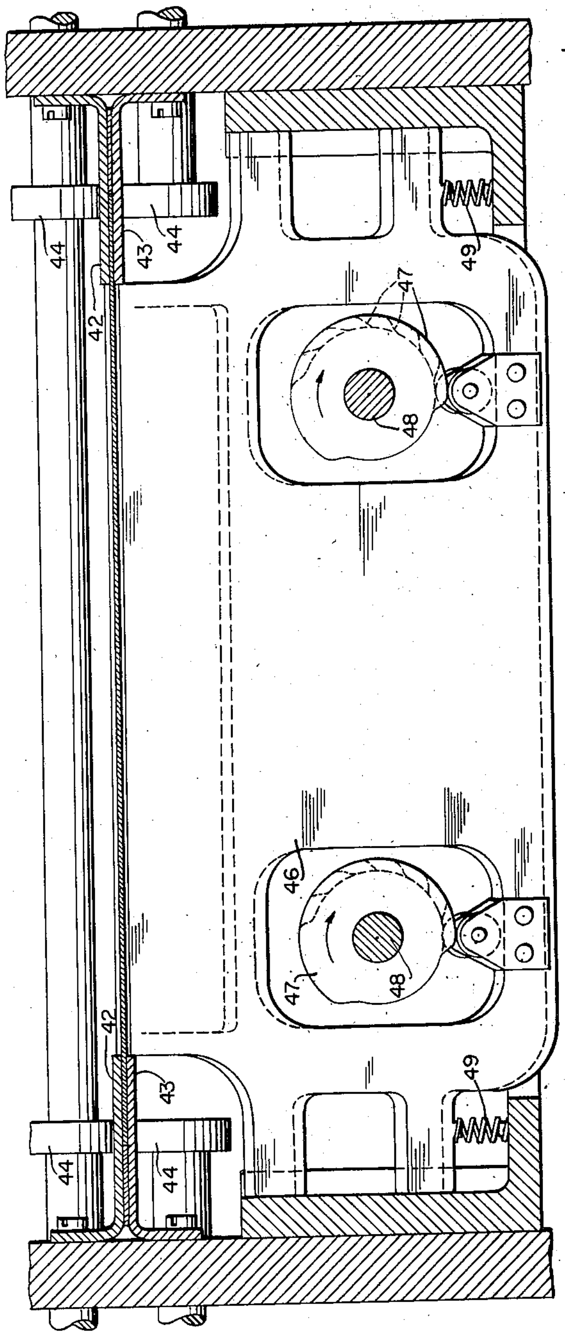
Fig. 4 is a sectional view taken on the line 4—4 of Fig. 2.

The gates preferably consist of a series of ten slides 46 (Fig. 4) which are positioned by two series of cams 47 fixed to respective shafts 48 and rotated thereby. The shafts 48 rotate in timed relationship with the other drive shafts of the machine and are so driven that high portions of the cams 47 successively depress the card gates 46 against compression springs 49 (Figs. 2 and 4) to enable the card to be fed against the next elevated card gate. The cam formation is such that during the time that a punch descends the card gate will remain elevated, thereby retaining the card in a temporarily stopped position. Of course, each successive card gate is held depressed after it is once depressed so as not to interfere with the passage of the card.

Thereafter, upon completion of punching in the first or "R" row the "R" gate is depressed and the card is frictionally fed against the elevated second "X" card gate. The "R" card gate is again lowered by the cam. This continues until the first ten horizontal rows are punched. When the tenth card gate at the extreme right for punching "7" drops the card is fed by the frictionally driven rollers 44 against a swinging card gate 50. The latter is pivoted on a stationary stud 51 and is urged by a spring 52 to coact with a profile cam 53 secured to a shaft 54. When the tenth card gate 46 drops cam 53 will position the swinging gate 50 to stop the card so that it enables punching in the eleventh or "8" index point row of the card. When this punching operation is completed cam 53 swings the gate 50 still further to the right and upwardly so as to align the card for punching the twelfth row or the "9" index point. Thereafter, the highest portion of cam 53 swings the gate 50 upwardly above the guide plate 42 so that the card is fed by rollers 44 to enter the bite of pressure driven rollers 45 at the exact time which brings it into synchronization with the rest of the elements of the machine.

Cams 47 are preferably profile cams, as shown, adapted to lower the associated card gate and have compression springs 49 underneath the card gate to restore, under control of the associated cam, the card gate to the uppermost card stopping position. The above preferred arrangement of card indexing mechanism enables the card to be progressively moved through the punching mechanism at the higher card speeds which is an objective in the design of this machine.

The frictionally driven rollers may be of the skewed type so that the card is side-aligned as it is fed through the card punch. Furthermore, suitable aligning rails cooperating with the side edges of the card may be provided if desired so as to locate the card exactly with respect to the card punches. Neither of these expedients is shown herein since they are well known in card punching machines.

*Setup device and interposer selection mechanism*

The characteristic features of the setup mechanism and punch selection device is that all of the movements of the parts are timed by and operated by cam operated bails so that the magnetically controlled punch selection may be effected by low current magnets which have no appreciable work to do since they merely determine whether hooks which connect interposers with the interposer operating bail will remain in normal or connecting position. Again, the interposers which are well known in the form of punching mechanism shown are not rocked directly by the punch magnets, such rocking being again likewise effected by said interposer operating bail which not only performs the connection of the selected interposers with the punch bail but also causes the interposers to be positively driven back to positively disengage the interposer from the punch bail upon completion of punching. The setup mechanism controlled by the magnets will now be described.

Fixed in suitable side frames of the machine is a frame plate 60 having projections disposed at the left so as to provide a series of guide slots 61 and 62 in which are slidably mounted a series of slides 63, there being one slide for each punch and interposer. Normally all of the slides are held elevated in a position shown in Fig. 1 by an associated spring 64 interconnected between an armature 65 of the slide 63 and an overhanging portion 66 of the frame plate 60. There is also provided an additional support plate 67 carrying a plurality of magnets 68, there being provided one magnet 68 for each punch 31, interposer 30 and slide 63. The magnets 68 may, because of the narrow spacing of the card columns and punches of the punching mechanism be a narrow type, or circular and they may be staggered to accommodate the narrow spacing.

Secured to a rock shaft 70 is a bail 71 adapted to receive a forked extremity 73 of a latching bell crank 74 pivoted at 75 to the associated slide 63. Also carried by each slide 63 is a stop pin 76. To rock shaft 70 there is connected a follower arm 77 having a follower roller cooperating with a profile cam 78 secured to a drive shaft 79 which is operable in timed relationship with the other operating shafts and rotates one revolution for each cycle point.

Figure 2:
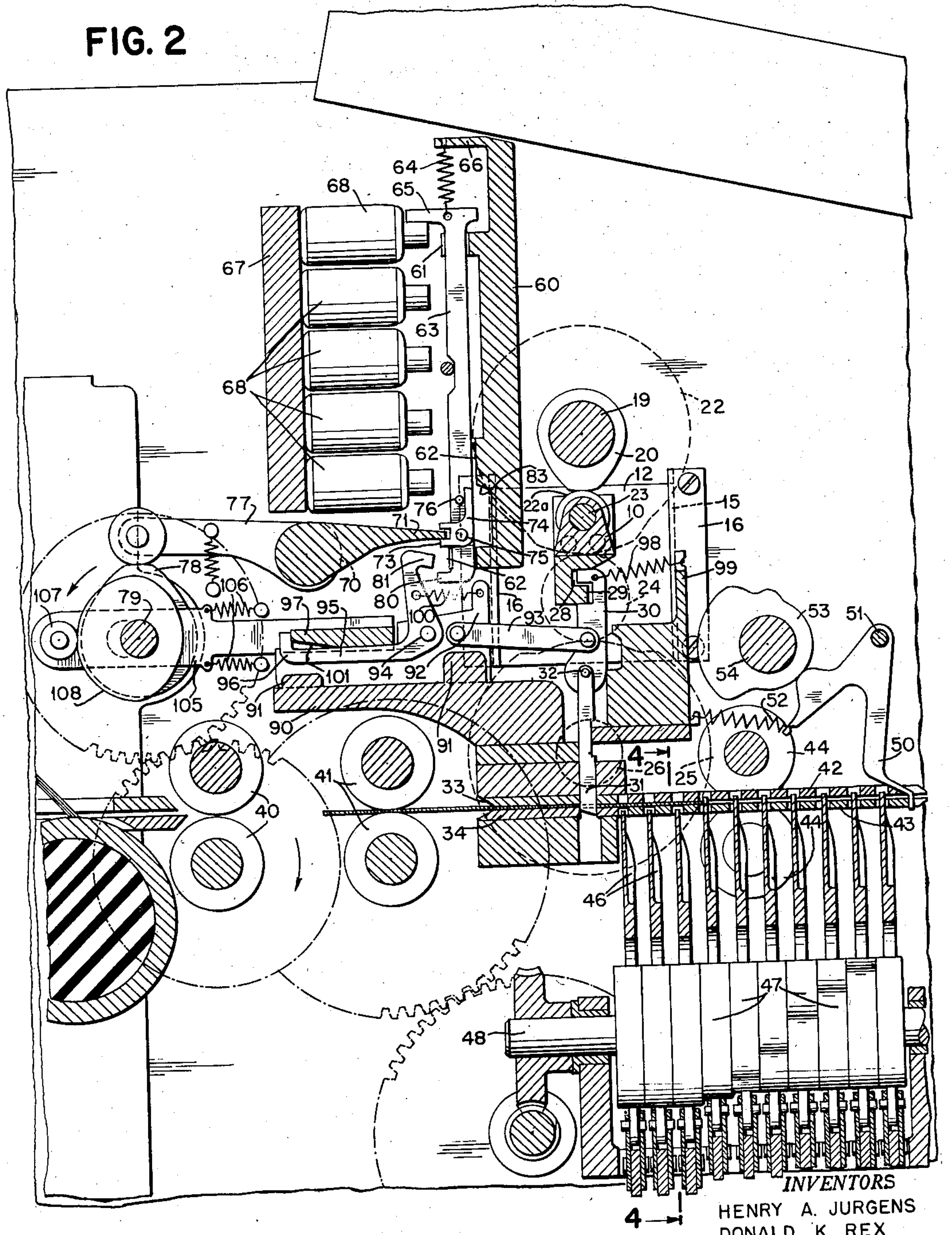
Fig. 2 is a sectional view on a larger scale showing the position certain parts have assumed when a card punching operation has just been effected.
Figure 3:
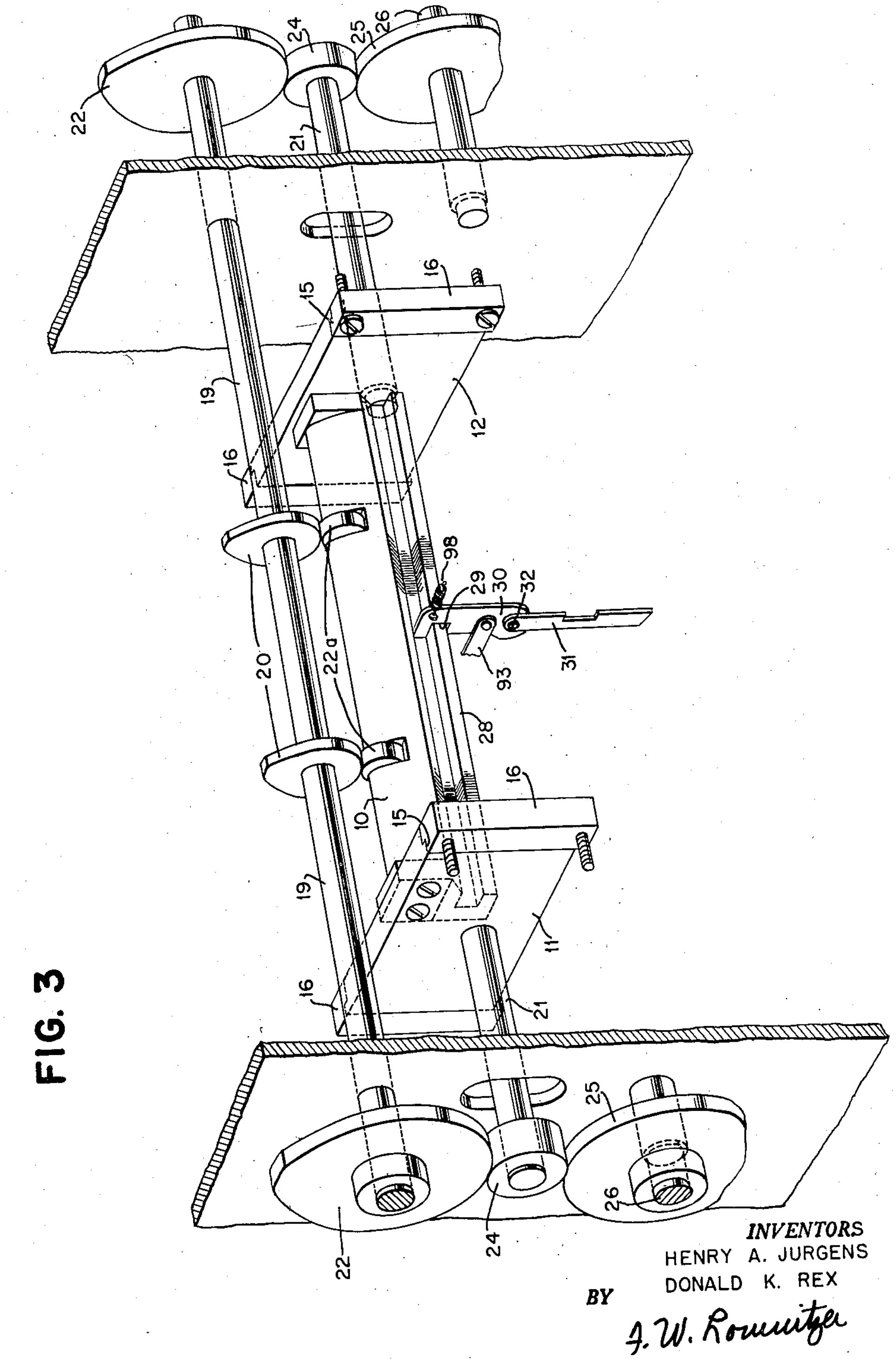
Fig. 3 is a perspective view showing mainly the cams for positively operating the punch bail in a straight line movement.
Figure 5:
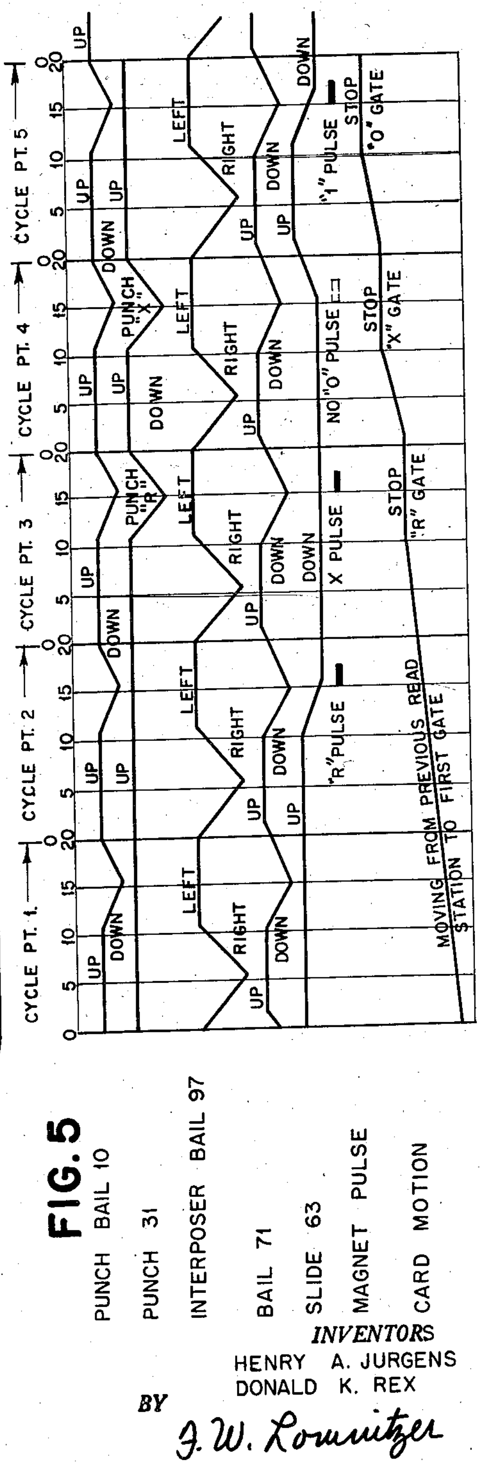
Fig. 5 is a timing diagram.

The timing of cam 78 to rock the bail 71 is shown in the timing diagram of Fig. 5. When the high portion of cam 78 engages the follower roller as shown in Fig. 2, it will rock shaft 70 slightly clockwise and the free end of bail 71 downwardly. Since the vertical arm of the latching bell crank 74 is now against pin 76 this will depress slide 63 downwardly against the action of spring 64, thereby disengaging a projection 80 of slide 63 from a cooperating finger 81. If at the time a slide 63 is in its lowermost position a magnet 68 should be energized as shown in Fig. 2, it will hold armature portion 65 against the magnetized core of the magnet 68, thereby retaining slide 63 in its downward position as long as the magnet 68 is retained energized. Since it is desirable to transmit short impulses to the magnet 68 as shown by the timing of Fig. 5, other means is provided to retain a slide 63 in its downward position and this is preferably effected by the following slight upward movement given to bail 71 which will rock the latching bell crank 74 slightly clockwise to bring its vertical arm underneath a locking shoulder 83 (Fig. 2) formed in the frame plate 60.

However, if a magnet 68 associated with a slide 63 is not energized spring 64 will be effective to return slide 63 upwardly as said bail 71 is rocked counterclockwise, said slide 63 positioning in its normal upward position its projection 80 opposite the finger 81 as shown in Fig. 1 for a function to be presently described.

The locking of the slides 63 in the downward position is for the purpose of placing projection 80 of the slide 63 beneath the associated finger 81, which relationship, as will be presently described, enables the connection of an interposer 30 with the punch bail 10 as shown in Fig. 2.

The interposer operating structure is mainly carried by a frame plate 90. Slidably mounted in guide slots formed by upstanding ears 91 is a slidable plate 92 which has a link connection 93 to the associated interposer 30. Pivoted on a pin 94 carried by plate 92 is a bell crank 95 carrying the aforementioned finger 81 and a tail 96 adapted to catch the left side of an operating bail 97 so that bail 97 at times fits between said tail 96 and a shoulder of plate 92. A spring 98 is interconnected between each interposer 30 and a spring anchor plate extension 99 for rocking the interposer to be disengaged from punch bail 10.

Also interconnected between the vertical arm of the bell crank 95 and an extension of the plate 92 is a spring 100 which is adapted at times to rock the bell crank 95 clockwise so as to cause tail 96 to catch the left edge of the bail 97.

Any suitable means may be provided for slidably mounting bail 97 and for operating said bail there is connected thereto a follower link 105 which is drawn by springs 106 so that a follower roller 107 engages the profile of a cam 108 secured to the drive shaft 79.

*Summary of operation*

As shown in the timing diagram of Fig. 5, the card is in motion in the cycle point 1 and moving toward the "R" stop gate 46. No impulse was sent to any of the magnets 68 in the previous cycle because this was the card transport period of a 20-cycle point machine. Thus, even if punch bail 10 is reciprocated in cycle point 1 no punches 31 are depressed because interposers 30 are disengaged from the punch bail 10. In this and each cycle point the interposer bail 97 is moved by its cam 108 from left to right and then back to left, but in cycle point 1 all of the interposers 30, bell cranks 95 and slides 92 are held to the right by associated springs 98 (Fig. 1). Bail 71 is also reciprocated, first up then down, but since no impulse was sent to any of the magnets 68 the slides 63 are returned to their uppermost position. When bail 97 moved to its left position the bevel 101 (Fig. 2) on its underside left edge rotated each bell crank 95 in a counterclockwise direction. The fingers 81 of said bell cranks 95 then cleared the projections 80 on slides 63 as they were lowered and then elevated.

In cycle point 2 punch bail 10 is again reciprocated but no punches 31 are operated in this cycle. Bail 97 again moves from left to right but does not push slides 92 ahead of it because they all remain in their right-hand position as in the previous non-punching cycle point. Bail 71 again draws slides 63 down and in the column that an "R" impulse is transmitted the associated magnet 68 will hold the related slide 63 down long enough to cause the related bell crank 74 to lock underneath the locking shoulder 83. The beveled edge 101 on the underside left edge of bail 97 rotated bell cranks 95 counterclockwise while slides 63 were being set up so that no interference existed between projections 80 and fingers 81.

In cycle point 3 interposer bail 97 is again moved through its cycle from left to right and as it does the bell crank 95 associated with the column which received the "R" impulse is rocked in a clockwise direction by its spring 100 so that its tail 96 now catches the left edge of bail 97 when it moved to the left. Bail 97 now draws plate 92, related link 93 and interposer 30 into engagement with punch plate 10 so that thereafter when punch bail 10 is depressed it drives punch 31 through the card. Just prior to this punching action the card had been stopped against the "R" gate 46 so that the punch 31 makes a hole in the "R" row of the selected column. While this was happening bail 71 was rocked through a cycle to disengage bell crank 74 from its locked position underneath locking shoulder 83. When punch bail 10 rises it draws punch 31 up with it because interposer 30 is still held in engagement with punch bail 10 by bail 97.

At the start of cycle point 4 bail 97 moves to the right and positively moves interposer 30 out of engagement with the punch bail 10. If in the previous cycle point No. 3 an X impulse is sent to a magnet 68 the related slide 63 is held down since its bell crank 74 is positioned underneath locking shoulder 83 so related bell crank 95 stays in its clockwise position as it travels to the right. When bail 97 moves to the left it again draws interposer 30 into engagement with punch bail 10. The "R" gate 46 was pulled down at the start of the cycle and by punching time the card is aligned by the "X" gate 46. The punch bail 10 causes the punching in the "X" row. During this punching time bail 71 rocked bell crank 74 out of its locked position and because no "0" pulse was sent to the setup magnet 68 slide 63 moves upward under the action of spring 64 as bail 71 moves up. The finger 81 of bell crank 95 has been pulled to the left at this time and does not interfere with the upward movement of slide 63.

At the start of cycle point 5 the "X" gate is pulled down and the card moves forward to be aligned by the "O" gate. Bail 97 moves from left to right and moves interposer 30 out of engagement with punch bail 10. When slide 92 and bell crank 95 moved to the right it caused the finger 81 of bell crank 95 to come in contact with the projection 80 of slide 63 and rotate bell crank 95 in a counterclockwise direction. When bail 97 moves to the left it passes over the tail 96 of bell crank 95 and rotates bell crank 95 slightly counterclockwise to disengage finger 81 from projection 80 so that slide 63 may again be set up again if the "1" pulse is sent to magnet 65. Spring 98 holds the interposer 30 out of the path of the punch bail 10 and no hole is punched in the "0" row.

In the same manner if the slide 63 is set up in cycle point 5 by the "1" pulse, the "1" row hole will be punched in cycle point No. 6.

It is clear from Fig. 5 that the setup mechanism is operated during one cycle point and retained set up to cause the punching of the hole in the next cycle point. In other words, the setup mechanism is being operated for the next cycle point while the machine is punching the hole that was set up in the previous cycle point, thus effecting a saving in time.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a punching machine for punching a card, a punching mechanism comprising a plurality of punches, a die plate and stripper plate between which a card to be punched passes, a power operated bar for causing the actuation of said punches, an interposer for each punch, punch selecting means for moving the interposers to connect related punches with said power operated bar, auxiliary guide plates parallel with said die and stripper plates for forming an extended aligned guide-way for said card as it is punched by said punches, a plurality of card stop plates projectible through guide slots of both guide plates to intersect the guide-way for the card and to coact with the leading edge of the card at substantially the complete edge of the card, card feeding means continually operated during the card punching operation for frictionally feeding the card, and means including a plurality of cams operable in timed relationship with respect to the operation of said power operated bar for positioning each card stop plate to intersect the guide-way and engage the leading edge of the card for stopping said card against the action of said frictional feeding means while said power operated bar actuates the punches to punch a position selected by each card stop plate, and for then positioning each card stop plate out of intersecting position in the guide-way after the operation of said punches by said power operated bar to release the card for action by the feeding means to feed the card to the next card stop plate in intersecting position to correlate a successive card position with the card punches.

2. In a punching machine for punching a card, a punching mechanism comprising a plurality of punches, a die plate and stripper plate between which a card to be punched passes, a power operated bar for causing the actuation of said punches, an interposer for each punch, punch selecting means for moving the interposers to connect related punches with said power operated bar, auxiliary guide plates parallel with said die and stripper plates for forming an extended aligned guide-way for said card as it is punched by said punches, a plurality of card stop plates projectible through guide slots of both guide plates to intersect the guide-way for the card and coact with the leading edge of the card, card feeding means continually operated during the card punching operation for frictionally feeding the card, spring means to position said card stop plates to cause said card stop plates to intersect the guide-way while said power operated bar actuates said punches, and a plurality of cams operable in timed relationship with the operation of said power operated bar for progressively positioning said stop plates out of intersecting position after the operation of said punches by said power operated bar for releasing the card to the action of the frictional feeding means to feed the card to cause the leading edge of the card to abut the next card stop plate in intersecting position to correlate the next position with said punches.

3. In a punching machine for punching a card, a punching mechanism comprising a plurality of punches, a die plate and stripper plate between which a card to be punched passes, mechanical means for causing the actuation of one or more of said punches, an interposer for each punch, an electromagnet for each interposer, a power operated bar for moving the interposers for connection with said mechanical means, means controlled by an electromagnet for causing the related interposer to be connected to said power-operated bar, card feeding means continually operated during the card punching operation for frictionally feeding the card, auxiliary guide plates forming an extended guide-way for said card, a plurality of card stop plates projectible through guide slots of both guide plates to intersect the guide-way for the card and to coact with the leading edge of the card to stop the card against the action of said feeding means while a punch is being selected and operated, and a plurality of cams for operating said card stop plates progressively and timed to operate after said mechanical means has actuated a selected punch to cause each card stop plate to be moved out of intersecting position for releasing the card to the action of the frictional feeding means to feed the card to the next card plate in intersecting position to correlate the next card position with the punches.

4. In a punching machine for punching a card, a punching mechanism comprising a plurality of punches, a guide plate and stripper plate between which a card to be punched passes, mechanical means for causing the actuation of one or more of said punches, an interposer for each punch, an electromagnet for each interposer, a power operated bar for moving the interposers into connection with said mechanical means, means under control of said electromagnet for causing the related interposer to be connected to said power operated bar, card feeding means continually operated during the card punching operation for frictionally feeding the card, auxiliary guide plates forming a guide-way for said card as it is punched by said punching mechanism, a plurality of card stop plates projectible through guide slots of both guide plates to intersect the guide-way for the card, a spring acting on each stop plate to cause said stop plate to coact with the leading edge of the card to stop the card against the action of said feeding means while the punch is being selected and operated, and a plurality of cams for operating said card stop plates progressively to cause each card stop plate to be moved out of intersecting position for releasing the card after each punch operation to the action of the frictional feeding means to feed the card to be stopped by the next card plate in intersecting position to correlate the next position with the punches.

5. In a punching machine for punching a card row by row, the combination of a plurality of punches, one for each card column, actuating means for said punches including an interposer for each punch for selectively operating said punch when said interposer is connected to said actuating means, means for feeding said card step by step corresponding to the rows past said punches, operating means comprising a reciprocable bar common to said interposers for rocking said interposers into connection with said actuating means, a supplemental interposer connected to the associated first named interposer adapted to be connected to said reciprocable bar, a plurality of low current magnets, and means controlled by each magnet when energized by a pulse for causing the associated supplemental interposer to be connected to said reciprocable bar to cause the latter through the connected supplemental interposer to rock the associated first named interposer for connection with the punch actuating means.

6. In a punching machine for punching a card row by row, the combination of a plurality of punches, one for each card column, actuating means for said punches including an interposer for each punch for selectively operating said punch when said interposer is connected to said actuating means, means for feeding said card step by step corresponding to the rows past said punches, operating means comprising a reciprocable bar common to said interposers for rocking said interposers into connection with said actuating means, a plurality of light duty magnets energized by impulses, means adapted to be positioned by a related magnet for causing the associated interposer to be engaged with the reciprocable bar to cause the latter to rock the interposer into connection with the punch actuating means, said magnet holding the last named means in said position for the life of the impulse, and means operable independently of said magnet for retaining said last named means in said position after the termination of said impulse.

References Cited in the file of this patent

UNITED STATES PATENTS

| | | |
|---|---|---|
| 1,405,513 | Hughes | Feb. 7, 1922 |
| 1,650,937 | Einstein | Nov. 29, 1927 |
| 1,691,917 | Braitmayer | Nov. 20, 1928 |
| 1,717,231 | Krell | June 11, 1929 |
| 2,240,667 | Paris | May 6, 1941 |
| 2,394,604 | Ford | Feb. 12, 1946 |
| 2,547,445 | Daly et al. | Apr. 3, 1951 |

FOREIGN PATENTS

| | | |
|---|---|---|
| 20,494 | Great Britain | Sept. 16, 1912 |